United States Patent [19]

Wedellsborg

[11] Patent Number: 5,690,456
[45] Date of Patent: Nov. 25, 1997

[54] APPARATUS FOR SECURING STRUCTURAL MEMBERS TOGETHER

[76] Inventor: Bendt W. Wedellsborg, 552 Maureen La., Pleasant Hill, Calif. 94523

[21] Appl. No.: 749,000

[22] Filed: Nov. 14, 1996

[51] Int. Cl.$^6$ .................................................. F16B 25/00
[52] U.S. Cl. ........................ 411/383; 411/384; 411/389; 411/397; 411/263
[58] Field of Search .................................. 411/383, 384, 411/389, 395, 397, 263, 222

[56] References Cited

U.S. PATENT DOCUMENTS

| 3,521,413 | 7/1970 | Scott et al. | 411/389 |
| 4,067,656 | 1/1978 | Dennis | 411/395 |

OTHER PUBLICATIONS

B. Barthlett et al: "Closure of PWR reactor Pressure Vessels, Analysis of Repairs and Anomalies in Threaded Stud-–Flange Assemblies" Smirt 11, Transactions, vol. D Aug. 1991, Tokyo.

*Primary Examiner*—Rodney M. Lindsey
*Assistant Examiner*—Frederick Conley
*Attorney, Agent, or Firm*—Thomas R. Lampe

[57] ABSTRACT

Apparatus for securing together structural members includes a stud threaded at both ends and a stud sleeve threaded at both ends. The stud and stud sleeve are coaxial with the stud extending through the stud sleeve and beyond the ends of the stud sleeve. The threaded stud ends and the threaded sleeve ends are separately threadedly connected to the structural members so that both the stud and stud sleeve apply forces to the structural members to secure them together. No significant transfer of load between the stud and the stud sleeve will occur.

25 Claims, 7 Drawing Sheets

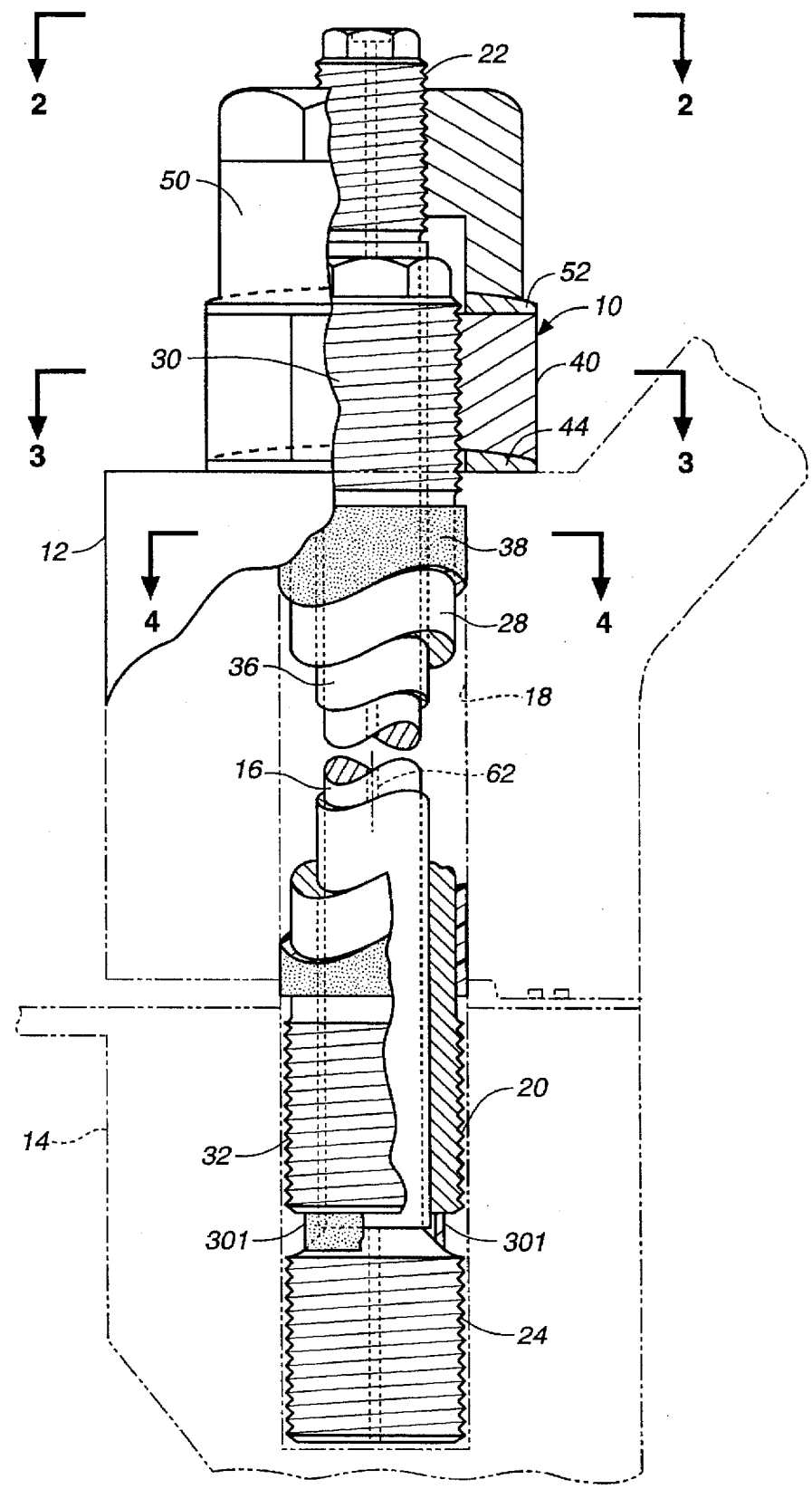
FIG._1

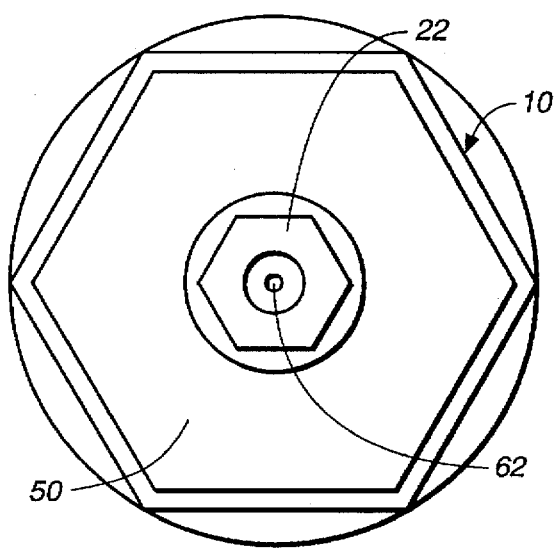
FIG._2
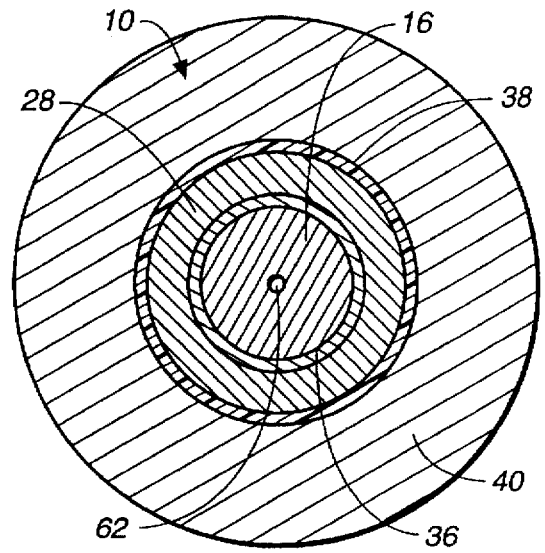
FIG._3
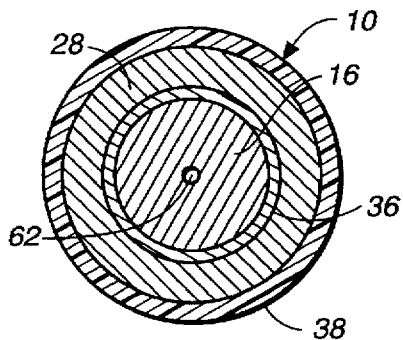
FIG._4
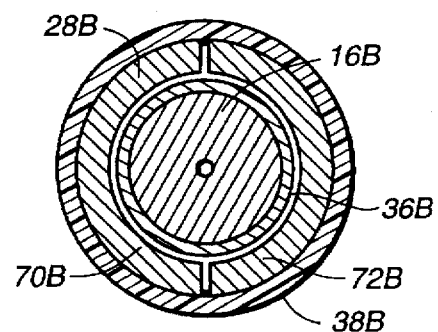
FIG._7

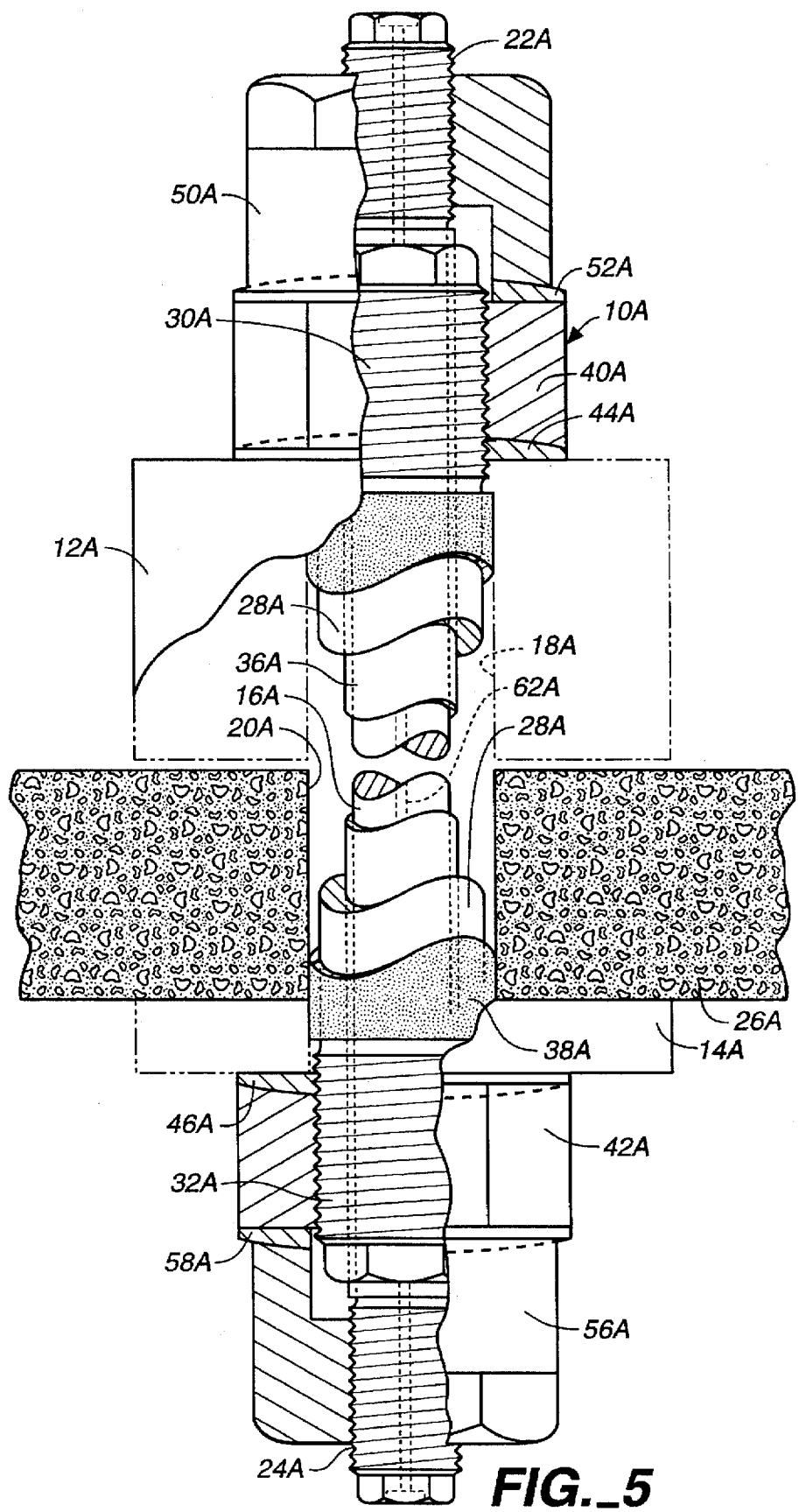
FIG._5

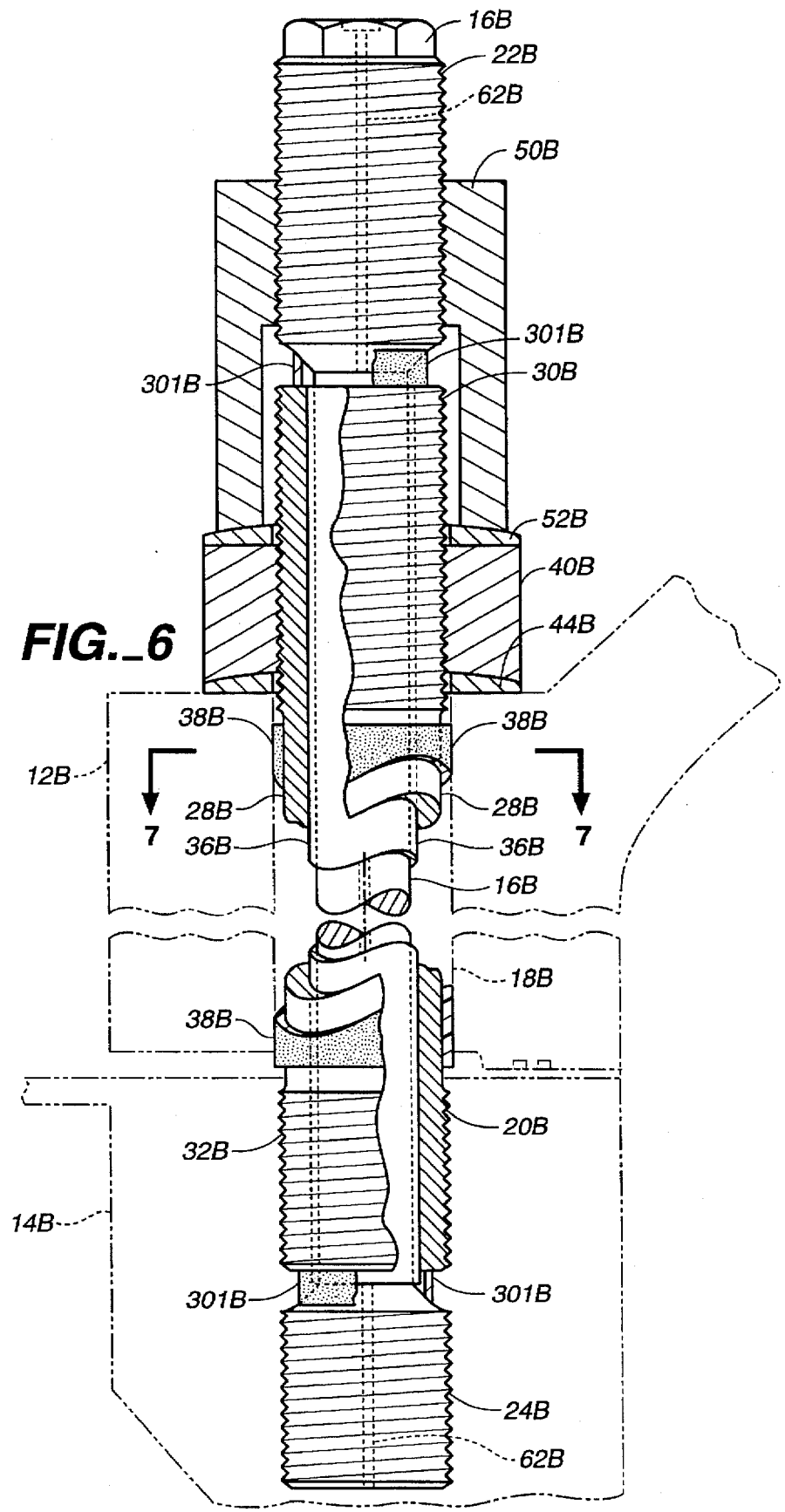
FIG._6

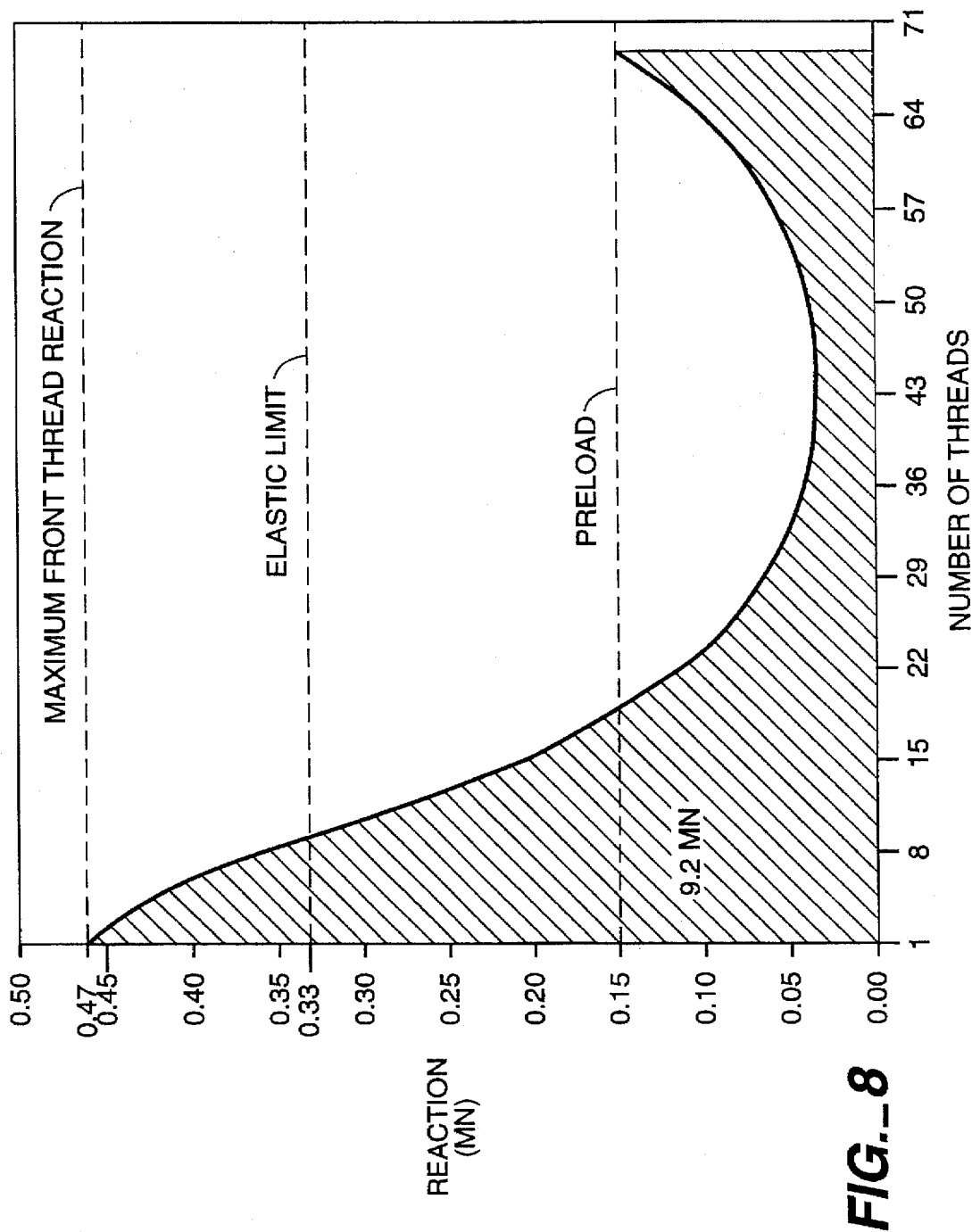
FIG._8

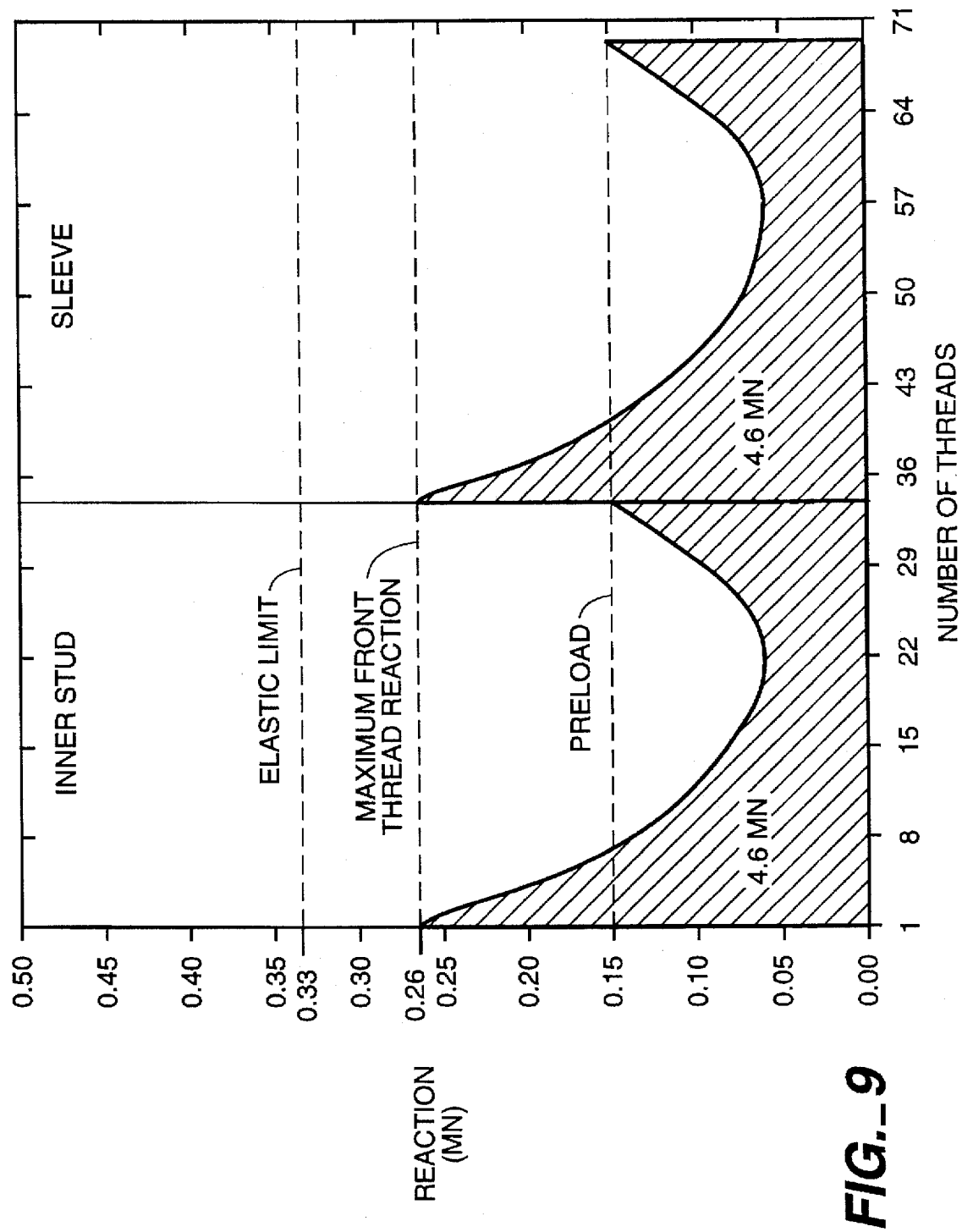
FIG._9

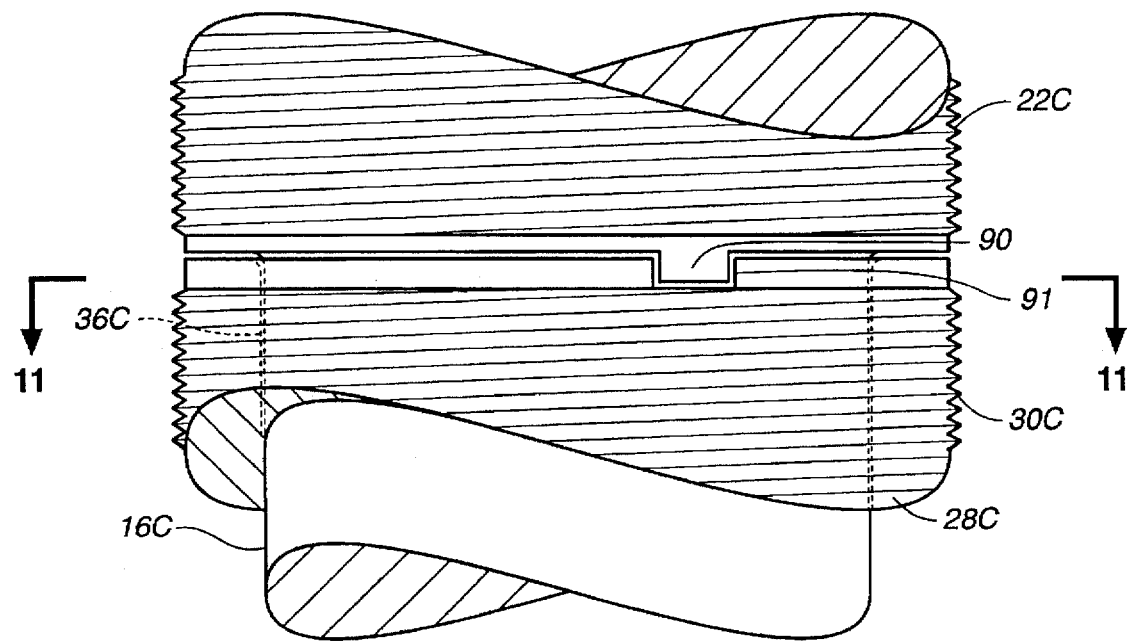
FIG._10
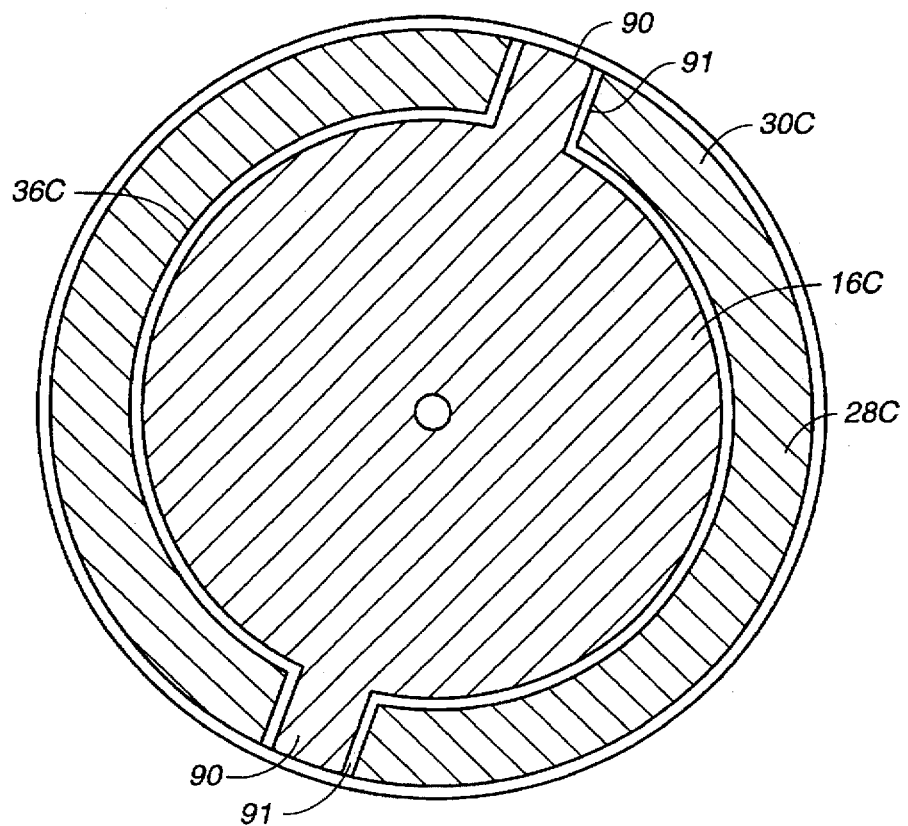
FIG._11

APPARATUS FOR SECURING STRUCTURAL MEMBERS TOGETHER

TECHNICAL FIELD

This invention relates to apparatus for replacing or substituting for conventional stud bolts in bolting systems of the type employed or employable in structures such as nuclear reactor pressure vessels, steam generator manways and other structures wherein cyclic loading and low-cycle fatigue present problems. An example of a non-nuclear application for the present invention would be for anchor bolts at the base of large towers for bridges subject to seismic load and or high wind loads, where low ductility of the existing anchor bolts may lead to brittle failure.

BACKGROUND OF THE INVENTION

During the past few years the nuclear power industry has experienced an increase in the number of reported bolt failures. Failure or degradation has been reported in several generic areas which may impact plant safety or reliability. The generic bolting applications where failures or degradation have been experienced by the industry include pressure boundary manways and flanges.

Degradation or failure of pressure boundary bolting is principally due to stress corrosion and fatigue induced cracking. The cause of these failures can be attributed to an undesirable combination of stress, environment and material condition. Bolts are subject to axial and/or a combination of axial and bending cyclic loading which may lead to fatigue and subsequent initiation and propagation of cracks in the highest stressed region of the bolt, which is located in the root fillet of the first or second threads. Thus some of the failures may be caused by low-cycle fatigue.

For nuclear reactor vessels in particular, any failure of the threads in the stud or nut or in the threaded bore of the reactor vessel flange may cause a prolonged delay during the next reactor outage, in order to extract and repair the damaged stud or bore. This in turn translates into considerably added expenses, since every day that goes by, when the reactor is shut down, costs a large amount of money.

For non-nuclear structures, large diameter anchor bolts may also suffer fatigue failures. Tests have shown that fatigue induced cracks often occur in the threaded portion of the anchor bolts.

It is an object of the present invention to eliminate or reduce these failures by substantially reducing stress levels in the highest stressed regions of the bolt (the root area of the threads).

The apparatus of the present invention is a substitute for a conventional large diameter stud bolt. It consists of two concentric, or co-axial elements: An interior stud and an outer stud sleeve which together have substantially the same cross-sectional area as the original stud bolt. Each of the two elements are threaded at both of their ends, and they are threadedly connected to their respective nuts or bores.

No significant axial load can be transferred between the two elements (stud and sleeve) during service.

This design results in a substantial reduction in the individual thread reactions and stresses, because the total number of front threads doubles.

Applicant is aware of a paper by B. Barthelett et al: "Closure of PWR reactor Pressure Vessels, Analysis of Repairs and Anomalies in Threaded Stud-Flange Assemblies" Smirt 11, Transactions, Volume D August 1991, Tokyo.

The paper describes the relations between the total force acting on a typical pressurized water reactor vessel stud, and the resulting reactions on each individual stud thread. A typical large diameter (170 mm) reactor vessel stud may have 70 threads at each end of the stud, and may be subject to cyclic loading with a maximum of 9.2 MN (MegaNewton) tension.

The first front thread in a typical reactor vessel stud with a total of 70 threads will, when the stud is prestressed to 1.8 MN and then subjected to a tensile load of 9.2 MN (equal to about one half of the yield capacity of the shank) carry a reaction of 0.47 MN which exceeds the thread's elastic limit of 0.33 MN. (The rear thread carries 0.15 MN). FIG. 8 of this patent specification illustrates that the 35 front threads carry about 70% of the total load while the 35 rear threads carry the remainder, only 30% of the load. The shaded area on the figure represents the total load 9.2 MN.

If one substitutes a "split" stud, as described herein, wherein the inner stud and the sleeve each have 35 threads for the original stud, (as illustrated in FIG. 9 of this patent) each component will carry one half of the 9.2 MN load. Thus, the front threads of the inner stud and sleeve will only be subject to a reaction of 0.26 MN which is less than the elastic limit (0.33 MN) of the threads.

The apparatus of the present invention, therefore, when subject to the same 9.2 MN load as the original stud, can undergo many more cycles to failure than can the original stud, because it operates entirely within its elastic limit.

Reduction of the highest stress levels translates into a substantial increase in the number of cycles to failure, thereby providing a safer connection. In addition, with the apparatus of the present invention, eventual failure is not sudden but rather is in the nature of a sequential failure, since the apparatus employs an inner stud and an outer stud sleeve. If the inner stud fails, the outer stud sleeve will carry the full load for an additional set of load cycles or vice versa.

As indicated above, the apparatus of the present invention has both nuclear and non-nuclear applications. For an existing nuclear reactor pressure vessel it may be possible to substitute a single apparatus of the present invention for an existing conventional type stud of the same diameter, thread dimensions, and the same or fewer total number of threads so that it will fit inside the existing threaded bore of the reactor flange.

For nonnuclear applications, increased anchor bolt ductility is accomplished by the apparatus of the present invention, because the reduced cross-sectional areas of the long, unthreaded portions of the stud and stud sleeve shanks permit them to reach yield, and stretch plastically before the short threaded portions of the shanks reach yield.

DISCLOSURE OF INVENTION

The present invention relates to apparatus for securing together first and second structural members. For example, the structural members may be the head and flange of a nuclear reactor pressure vessel. However, the first and second structural members may also be those of a non-nuclear structure Subjected to axial or a combination of axial and shear and bending cyclic load forces.

The apparatus includes a stud having a first threaded stud end and a second threaded stud end (which may be upset or tapered) spaced from the first threaded stud end.

A stud sleeve extends about the stud, the stud sleeve having a first threaded sleeve end and a second threaded sleeve end spaced from the first threaded sleeve end.

First stud connector means is located at the first structural member for threaded engagement with the first threaded stud end to connect the stud to the first structural member.

Second stud connector means is located at the second structural member for threaded engagement with the second threaded stud end (which may be upset or tapered) to connect the stud to the second structural member.

First sleeve connector means is located at the first structural member for threaded engagement with the first threaded sleeve end to connect the stud sleeve to the first structural member.

Second sleeve connector means is located at the second structural member for threaded engagement with the second threaded sleeve end to connect the stud sleeve to the second structural member.

The stud and stud sleeve are substantially coaxial with the first and second threaded stud ends of the stud projecting outwardly from the first and second sleeve ends respectively.

For the case wherein one or both ends of the stud are upset and/or tapered, a compressible spacer ring is provided between the stud upset end, and the adjacent sleeve end.

The function of the spacer ring is to keep stud and sleeve separate, axially, during installation, but it must only provide negligible resistance to differential axial motion of stud and sleeve during service.

Therefore the spacer must have small cross-sectional area and low modulus of elasticity, e.g. be constructed of lead.

Axial forces cannot be transmitted between the stud and the sleeve during service.

Other features, advantages, and objects of the present invention will become apparent with reference to the following description and accompanying drawings.

BRIEF DESCRIPTION OF DRAWINGS

FIG. 1 is an elevation view, in partial cross-section, illustrating apparatus constructed in accordance with the teachings of the present invention in position on the closure head flange and pressure vessel body flange of a nuclear reactor pressure vessel to secure them together;

FIG. 2 is a top plan view of the apparatus as taken in the direction of the line 2—2 in FIG. 1;

FIG. 3 is a cross-sectional view taken along the line 3—3 in FIG. 1;

FIG. 4 is a cross-sectional view taken along the line 4—4 in FIG. 1;

FIGS. 5 and 6 are views similar to FIG. 1 but illustrating two alternative embodiments of the apparatus;

FIG. 7 is a cross-sectional view taken along the line 7—7 of FIG. 6;

FIG. 8 is a diagrammatic representation illustrating the individual thread reactions of a typical conventional threaded stud having axial tensile forces applied thereto;

FIG. 9 is a diagrammatic representation illustrating the thread reactions of an inner stud and sleeve employed in the apparatus of the present invention;

FIG. 10 is an enlarged elevation view of an alternate form of the invention suitable for non-nuclear applications, in particular of adjacent threaded stud and sleeve ends and an interspace filled with lubricant or grease, the latter shown in phantom; and FIG. 11 is a cross-sectional view taken along the line 11—11 in FIG. 10.

MODES FOR CARRYING OUT THE INVENTION

Referring now to FIGS. 1–4, apparatus constructed in accordance with the teachings of the present invention is designated by reference numeral 10. In FIG. 1, apparatus 10 is shown in position on adjoining members 12, 14 which may, for example, be the flanges of a nuclear reactor pressure vessel closure head and a pressure vessel body, respectively. However, as pointed out above, the principles of the present invention are applicable to other structures, both nuclear and non-nuclear.

Apparatus 10 includes a stud 16 formed of steel or other suitable material which passes through bore 18 and into bore 20 formed in flanges 12, 14, respectively. The stud has a threaded stud end 22 and an opposed upset or tapered threaded stud end 24 spaced from threaded stud end 22.

Also extending through bore 18 and into bore 20 is a stud sleeve 28 also formed of steel or other suitable metal. Stud sleeve 28 surrounds the shank of stud 16 the stud and stud sleeve being coaxial. Stud sleeve 28 has two threaded sleeve ends 30, 32 spaced from one another. The threaded stud ends 22 and 24 of stud 16 project outwardly from the sleeve ends, as shown. That is, the stud sleeve is shorter than the stud.

The stud and stud sleeve define an annular space therebetween which for a nuclear reactor accommodates a thermal conducting sleeve 36 formed of a suitable heat conductive material such as lead. Sleeve 36 which, when hot, may also provide low friction resistance against differential axial motion of the stud and sleeve.

For non-nuclear applications, the interspace may be filled with lubricant or grease.

An insulating sleeve 38 formed of fiberglass or other suitable insulating material may surround stud sleeve 28.

At the upper end thereof, as viewed in FIG. 1, the sleeve end 30 of stud sleeve 28 threadedly engages a base nut 40. The lower end of the stud sleeve, sleeve end 32, is threadedly engaged with member 14 within the existing reactor flange bore 20.

In the arrangement under discussion, a washer 44, which is a spherical washer having an outwardly disposed convex surface, is positioned between base nut 40 and flange member 12, the base nut having a correspondingly shaped recess formed therein for receiving the washer.

Stud connector means in the form of a top outer nut 50 is threadedly secured to stud 16 at threaded stud end 22. A washer 52 may be disposed between nut 50 and base nut 40.

Lower end 24 of stud 16 is threadedly connected to member 14 within reactor flange bore 20.

It may be seen from the above that both the stud and the stud sleeve are utilized to secure flange members 12, 14 together. It is preferable that the stud sleeve and the stud have certain dimensional characteristics. The stud includes an unthreaded stud shank portion between the threaded stud ends and the stud sleeve includes an unthreaded stud sleeve shank portion between the threaded sleeve ends. The unthreaded stud shank portion and the unthreaded stud sleeve shank portion may have generally equal cross-sectional areas. That is, the net areas of the sleeve shank and the stud shank are the same with the outer diameter of the inner stud equaling about 0.707 times that of the outer diameter of the stud sleeve shank so that the cross-sectional area of the sleeve shank and the inner stud is substantially the same.

Preferably however, the cross-sectional areas of the stud, and the sleeve should be determined by calculation using known structural engineering principles to result in the minimum possible service stresses in the stud and the sleeve.

Installation of the apparatus may normally be accomplished as follows:

A compressible spacer ring 301 which may be made of lead, is placed around the shank of stud to provide an axial space between stud upset head 24 and sleeve end 32 during installation. Then later, during service, the spacer ring will be hot and soft enough so that it will not transmit any significant axial load between the stud and the sleeve during service.

Thermal sleeve 36 is then placed around the stud shank 16. Sleeve 28 with thermal insulation 38 may then be heated, and then placed around the stud shank and its thermal sleeve.

The assembled stud with spacer ring, thermal sleeve, and stud sleeve with thermal insulation is then inserted into bore 18 of the reactor head flange. The stud is then screwed (torqued) into bore 20. The low friction between stud 16, thermal sleeve 36, and sleeve 28 may be sufficient also to turn sleeve 28 into bore 20 when the stud is torqued down.

An electric resistance heater rod of conventional construction (not shown) is lowered into a "heater hole" 62 located at the center of the stud. The stud and stud sleeve are thermally bonded by the thermal conductive, low friction sleeve 36 formed of lead or other suitable material and the stud and stud sleeve assembly is externally thermally insulated by the outer insulating sleeve 38. The stud and stud sleeve are thus heated substantially uniformly, for example to a temperature of about 150 degrees Celsius, and the assembly expands and elongates.

The nuts 40 and 50 are then tightened substantially uniformly. The heater rod is removed from the stud and the stud assembly then cools down and contracts whereby tension (preload) is generated in the inner stud and the stud sleeve. Nearly equal preload stresses are generated in the stud and stud sleeve. The pre-loads are proportional to the product of the initial preload strain and the overall spring coefficient of stud shank and threads. Measurement of strain in the stud and sleeve is possible by insertion of ultrasonic or other measuring devices (not shown) in the heater hole 62. This may be followed by a final adjustment of the position of the nuts.

An alternate, but more conventional way of installation may involve the (sequential) tensioning of stud and sleeve by a process well known in the art. The stud and sleeve are tensioned, and nuts securely threaded thereon and (sequentially) torqued to predetermined levels by a stud tensioner robot. A measuring rod is received within the vertical hole or bore 62 which extends the entire length of the stud and is used to measure stud and sleeve elongation to ensure proper tensioning.

The system components including the threads will operate in the elastic range during normal service, including operational cyclic loads. If the assembly became subject to abnormal loads then the highest-stressed threads and thread fillets at the base of the threaded stud and nut will be the first to reach yield. As they deform in the plastic range, a shift in load distribution away from the inner stud toward the larger diameter outer stud sleeve which may possess higher thread capacity, would occur or vice versa.

Fatigue crack initiation at or near the root of the first thread at the base of the threaded end of the stud, after it has sustained a number of cycles, may be the most likely initial failure mode. This would be followed either by through shank failure or cracking in the next threads. Additional cycles can be subsequently sustained by the stud sleeve until complete failure of the entire assembly.

The outer and base nuts are circular hexagonal or partly hex and circular to facilitate use of a stud tensioner. They may be removed and/or installed in one step, or sequentially.

A second embodiment of the invention is shown in FIG. 5. In this embodiment, designated by reference numeral 10A, the stud, and sleeve are cylindrical, they have no upset or tapered ends. The stud-sleeve assembly ties a baseplate 12A of a steel superstructure, to a concrete foundation 26A. Nuts 40A, 42A, 50A and 56A are deployed at the ends of the stud/stud sleeve assembly. Nuts 40A, 42A, 50A, and 56A are threadedly engaged respectively with the stud sleeve 28A and the stud 16A.

Here the threaded stud ends 22A, 24A have outside diameters substantially equal to the inside diameter of threaded sleeve 28A.

A bore 20A is formed in anchor plate 14A. Threaded stud end 24A and threaded sleeve end 32A are threadedly engaged with the nuts 56A and 42A, the threads of the stud and stud sleeve being of the same type.

Threaded stud end 22A and threaded sleeve end 30A are threadedly engaged with nuts 50A and 40A, respectively.

A third embodiment of this invention is shown on FIGS. 6 and 7. In this embodiment both ends of stud 16B are upset, and tapered, and this interspace for the thermal sleeve 36B is reduced to about 1 mm or less, so that the total cross-sectional area of stud and sleeve shank almost equals the cross-sectional area of the conventional stud it replaces.

It will be appreciated that the construction of apparatus embodiment 10B calls for specialized fabrication techniques. One way of accomplishing such construction could involve precise cutting by laser or other means of the stud sleeve 28B along a central vertical plane to cut the stud sleeve into two halves (designated by reference numerals 70B, 72B in FIG. 7). The two halves of the sleeve would then be placed onto the shank of the inner stud (after the lead filler sleeve has been placed in position). The unthreaded shank portion of the stud sleeve would then be welded by partial penetrating groove or butt welding. The sleeve would then be threaded at each end by well known thread formation techniques.

Compressible spacer rings 301B must be placed at both ends of the sleeve where it abuts the upset ends of the stud in order to space the sleeve axially from the stud during installation, and later on, when the reactor is hot to prevent any transmittal of significant axial loads between stud and sleeve during service.

The principal advantage of using this alternative approach is that the stud/stud sleeve assembly is believed to be able to withstand many more load cycles to failure as will the embodiment illustrated in FIGS. 1–5. Tapering of the stud reduces substantially the stress concentration factors applied to this element.

This invention shall not be limited to the examples discussed above. Any combination of inner stud, and sleeve, nut and washer and spacer and flange cross-sectional areas, length and materials and any combination of stud and sleeve upper and lower straight or upset threaded ends, diameters, length, size and number and pitch of the threads, and also the material and dimensions of nuts, washers, spacer rings, and thermal sleeve or lubricants and threaded bores of nuts and flanges if any, may be used. A calculation to determine the optimum size or material combination of all of these parameters, and of the pre-loads to be applied to the inner stud and the sleeve should be performed using known structural teachings in order to obtain minimum stress levels and maximum capacities of the components.

A fatigue analysis based on ASME (American Society of Mechanical Engineers) code procedures should be performed subsequently.

FIGS. 8 and 9 have been described above and reference thereto may be had to compare the thread reaction characteristics of a conventional single stud (FIG. 8) and the stud/stud sleeve components of the present invention (FIG. 9) under load.

FIGS. 10 and 11 illustrate an alternate form of the invention which may be used in non-nuclear applications, for example, at or near room temperature. On this arrangement, a lead-based thermal sleeve is not employed. Instead, the thermal sleeve 36C may suitably be a graphite or nickel-based lubricant which will not be "frozen" solid at normal room temperatures as would lead.

In the FIGS. 10 and 11 embodiment, notches 91 for projections or "shear keys" 90 are located at threaded sleeve end 30C. These notches receive projections ("shear keys") 90 projecting from threaded stud end 22C. Such an arrangement allows simultaneous threading (or unthreading) of the stud 16C and the sleeve 28C relative to the structure they threadedly engage when torque is applied to the stud.

I claim:

1. Apparatus for securing together first and second structural members, said apparatus comprising, in combination:
   a stud having a first threaded stud end and a second threaded stud end spaced from said first threaded stud end;
   a stud sleeve extending about said stud, said stud sleeve having a first externally threaded sleeve end and a second externally threaded sleeve end spaced from said first threaded sleeve end;
   first stud connector means for being located at said first structural member for threaded engagement with said first threaded stud end to connect said stud to said first structural member;
   second stud connector means for being located at said second structural member for threaded engagement with said second threaded stud end to connect said stud to said second structural member;
   first sleeve connector means for being located at said first structural member for threaded engagement with said first threaded sleeve end to connect said stud sleeve to said first structural member; and
   second sleeve connector means for being located at said second structural member for threaded engagement with said second threaded sleeve end to connect said stud sleeve to said second structural member.

2. The apparatus according to claim 1 wherein said stud and said stud sleeve are substantially coaxial and wherein said first and second threaded stud ends of said stud project outwardly from said first and second sleeve ends respectively and wherein no substantial axial forces are being transmitted between said stud and said stud sleeve.

3. The apparatus according to claim 1 wherein at least one of said stud connector means comprises an internally threaded nut.

4. The apparatus according to claim 1 wherein at least one of said sleeve connector means comprises an internally threaded nut.

5. The apparatus according to claim 1 wherein at least one of said stud connector means comprises a first nut threadedly engaging said stud and wherein at least one of said sleeve connector means comprises a second nut threadedly engaging said stud sleeve, located adjacent to said first nut, and exerting a compressive reaction force on said first nut when said first and second structural members are secured together by said apparatus.

6. The apparatus according to claim 5 additionally comprising a washer positioned between said first nut and said second nut.

7. The apparatus according to claim 4 additionally comprising a washer positioned between said nut and one of said structural members.

8. The apparatus according to claim 1 wherein said stud and said stud sleeve define an annular space therebetween and wherein said apparatus additionally comprises a thermal conducting sleeve formed of heat conductive material located in said annular space to transfer heat between said stud and said stud sleeve.

9. The apparatus according to claim 8 wherein said heat conductive material is at least partially comprised of lead.

10. The apparatus according to claim 1 additionally comprising an insulating sleeve surrounding said stud sleeve.

11. The apparatus according to claim 1 wherein said stud defines a hole for receiving means for heating said stud and for receiving means for measuring physical characteristics of said stud.

12. The apparatus according to claim 1 wherein said stud includes an unthreaded stud shank portion between said first and second threaded stud ends and wherein said stud sleeve includes an unthreaded stud sleeve shank portion between said first and second threaded sleeve ends, said unthreaded stud shank portion and said unthreaded stud sleeve shank portion having generally equal cross-sectional areas.

13. The apparatus according to claim 1 wherein said stud has an upset or tapered outer stud surface adjacent to at least one threaded stud end.

14. The apparatus according to claim 1 wherein at least one of said stud connector means comprises internal threads defined by one of said structural members.

15. The apparatus according to claim 1 wherein at least one of said stud ends is tapered.

16. The apparatus according to claim 1 wherein at least one of said stud ends is upset.

17. The apparatus according to claim 16 additionally comprising a compressible spacer between an upset stud end and said stud sleeve.

18. The apparatus according to claim 1 wherein at least one of said sleeve connector means comprises internal threads defined by one of said structural members.

19. The apparatus according to claim 12 wherein said unthreaded stud shank and said unthreaded sleeve shank have different cross-sectional areas.

20. The apparatus according to claim 16 additionally comprising compressible spacer rings located between said sleeve ends and said upset stud ends.

21. The apparatus according to claim 1, wherein the service stresses of said stud and said stud sleeve are substantially equal.

22. The apparatus according to claim 16 where at least one notch and projection is provided at said upset stud end and said stud sleeve end.

23. The apparatus according to claim 8, where said stud and stud sleeve define an annular space, said annular space filled with a lubricating material.

24. The apparatus according to claim 23, where said lubricating material at least partially comprises nickel or graphite.

25. The apparatus according to claim 1 where said stud and sleeve connector means all operate within the elastic limits of their materials during normal service.

* * * * *